(12) United States Patent
Meneely

(10) Patent No.: US 8,072,582 B2
(45) Date of Patent: Dec. 6, 2011

(54) LIDAR SYSTEM USING A PSEUDO-RANDOM PULSE SEQUENCE

(75) Inventor: Clinton T. Meneely, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 204 days.

(21) Appl. No.: 12/543,621

(22) Filed: Aug. 19, 2009

(65) Prior Publication Data

US 2010/0045965 A1   Feb. 25, 2010

Related U.S. Application Data

(60) Provisional application No. 61/089,965, filed on Aug. 19, 2008.

(51) Int. Cl.
*G01C 3/08* (2006.01)
(52) U.S. Cl. ............... 356/5.01; 356/3.01; 356/4.01; 356/5.1
(58) Field of Classification Search ......... 356/3.01–28.5
See application file for complete search history.

(56) References Cited

U.S. PATENT DOCUMENTS

| 6,356,677 | B1 | 3/2002 | Hall | |
|---|---|---|---|---|
| 6,393,377 | B1 * | 5/2002 | Shirai et al. | 702/159 |
| 2005/0231710 | A1 * | 10/2005 | Jamieson et al. | 356/28 |
| 2006/0227315 | A1 * | 10/2006 | Beller | 356/3 |
| 2007/0215795 | A1 * | 9/2007 | Kameyama et al. | 250/222.2 |
| 2008/0074640 | A1 * | 3/2008 | Walsh et al. | 356/5.01 |

FOREIGN PATENT DOCUMENTS

| EP | 0379609 | * | 8/1990 |
|---|---|---|---|
| EP | 0379609 | A | 8/1990 |
| EP | 1712888 | A | 10/2006 |
| GB | 2384126 | A | 7/2003 |

OTHER PUBLICATIONS

European Search Report issued by the European Patent Office for EP Application No. 09252015.4, dated Feb. 8, 2010.
D.J. Butler, et al., The Importance of Sodium Laser Guide Star LIDAR during Open Loop Operation at Large Telescopes, Beyond Conventional Adaptive Optics, Venice, 2001.
David J. Butler, et al., Design of the Atmospheric Sodium Profiler for the VLT Laser Guide Star.
Renaud Matthey, et al., Pseudo-random noise-continuous-wave laser radar for surface and cloud measurements, Science Direct, Optics and Lasers in Engineering, vol. 43, Issues 3-5, Mar.-May 2005, pp. 557-571, World Wide Web page printed Nov. 11, 2009.

* cited by examiner

*Primary Examiner* — Thomas Tarcza
*Assistant Examiner* — Luke Ratcliffe
(74) *Attorney, Agent, or Firm* — Kevin O'Brien; Calfee, Halter & Griswold LLP

(57) ABSTRACT

A light detection and ranging system includes a transmitter transmitting a transmitted light pulse timing sequence, with pseudo-random timing and including a plurality of light pulses, toward a target. An optical receiver receives a reflected light pulse timing sequence including a plurality of light pulses from the target. An electronic control unit identifies a time delay between the transmitted light pulse timing sequence and the reflected light pulse timing sequence as a function of a correlation between the transmitted and reflected light pulse timing sequences.

20 Claims, 9 Drawing Sheets

LIDAR SYSTEM USING A PSEUDO-RANDOM PULSE SEQUENCE

This application claims the benefit of U.S. Provisional Application No. 61/089,965, filed Aug. 19, 2008, which is hereby incorporated by reference.

BACKGROUND

The present invention relates to a scanning optical ranging system. It finds particular application in conjunction with a light detection and ranging (LIDAR) system and will be described with particular reference thereto. It will be appreciated, however, that the invention is also amenable to other applications.

A light detection and ranging (LIDAR) system transmits a pulse of light (e.g., from a laser), which is reflected from a target. An optical receiver detects the reflected light, and the range to the target is computed from the delay time between the transmission of the light pulse and the detection of the reflected light. The receiver field-of-view and the transmitted light beam are usually matched and co-aligned to ensure maximum light collection efficiency.

Targets at farther ranges typically result in reflected optical pulses having relatively lower intensities at the optical receiver. Therefore, optical background noise and receiver electronic noise detected by the optical receiver may incorrectly be viewed as additional pulses from the target. These spurious additional pulses tend to cause confusion and, therefore, may lead to inaccurate range determinations to the target. For example, these additional pulses may result in false triggers at the optical receiver. Increasing power of the optical pulse tends to also increase other non-liner effects in the laser and introduce more background noise.

The present invention provides a new and improved LIDAR system which addresses the above-referenced problems.

SUMMARY

In one embodiment, a light detection and ranging system includes a transmitter transmitting a transmitted light pulse timing sequence, with pseudo-random timing and including a plurality of light pulses, toward a target. An optical receiver receives a reflected light pulse timing sequence including a plurality of light pulses from the target. An electronic control unit identifies a time delay between the transmitted light pulse timing sequence and the reflected light pulse timing sequence as a function of a correlation between the transmitted and reflected light pulse timing sequences.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENTS

Figure 1:
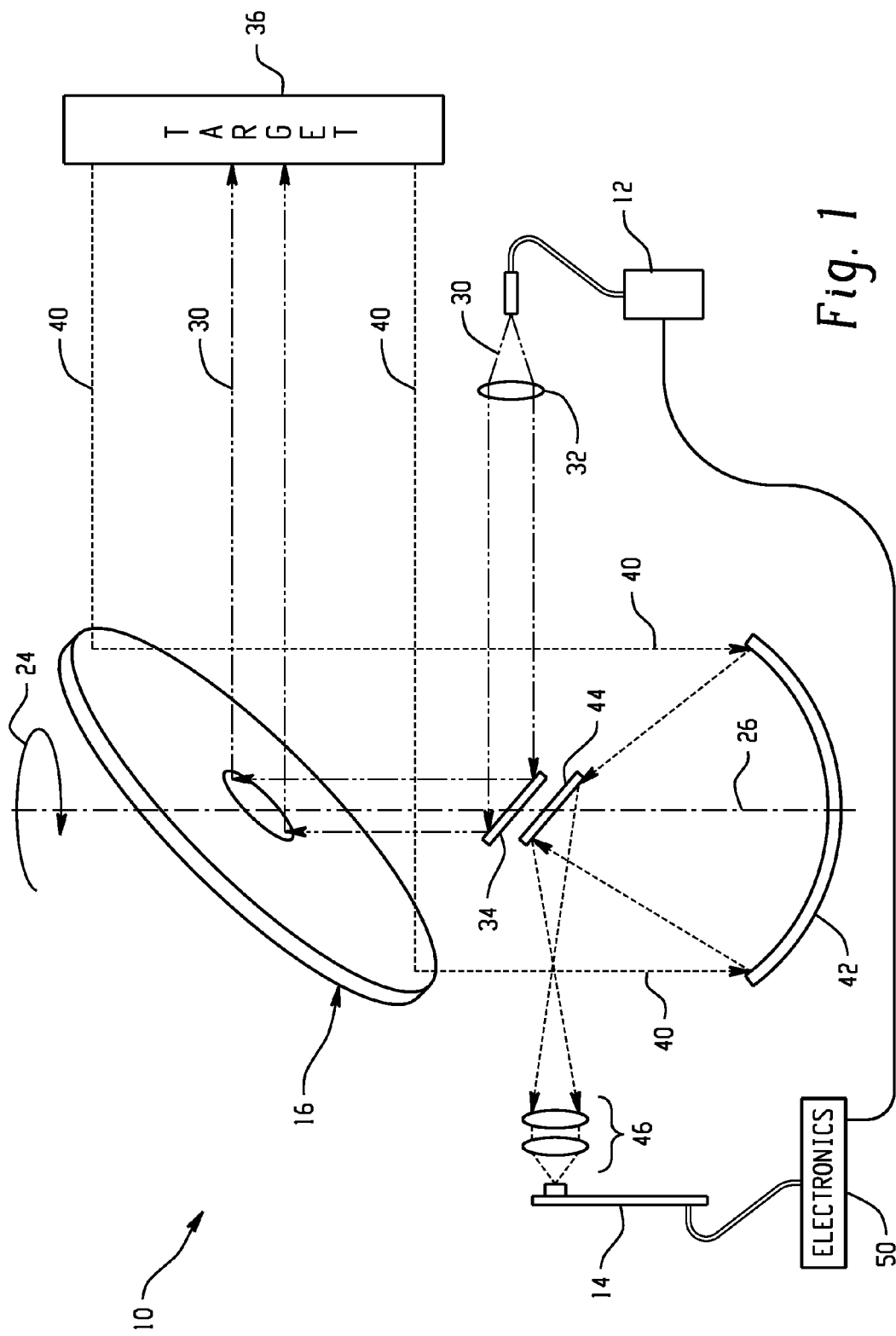
FIG. 1 illustrates a schematic representation of a simplified component diagram of an exemplary optical scanning LIDAR system in accordance with one embodiment of an apparatus illustrating principles of the present invention.

With reference to FIG. 1, a simplified component diagram of an exemplary optical scanning LIDAR system 10 is illustrated in accordance with one embodiment of the present invention.

With reference to FIG. 1, the optical scanning LIDAR system 10 includes a transmitter 12, an optical receiver 14, and a mirror unit 16. In one embodiment, both the transmitter 12 and optical receiver 14 rotate (scan) together at a constant rotation (speed) in one direction. More specifically, rotating elements, specifically the mirror unit 16, rotate (as illustrated by 24) at a predetermined speed about a scan axis 26.

A transmitted light pulse timing sequence 30 leaving the transmitter 12 passes through at least one lens 32 for collimating the transmitted light pulse timing sequence 30. It is contemplated that the transmitter 12 is a master oscillator power amplifier (MOPA) fiber laser. The light pulse timing sequence 30 is considered "pseudo-random" since the timing sequence is generated by an algorithm using, for example, prime numbers. The algorithm produces a sequence of numbers approximating the properties of truly random numbers. The same pseudo-random pulse sequence is produced at each transmission interval. In this sense, the light pulse timing sequence 30 includes pseudo-random timing.

The transmitted light pulse sequence 30 is reflected off a first mirror 34 (e.g., a flat mirror) toward the mirror unit 16, where the transmitted light pulse sequence 30 is reflected toward a target 36. In one embodiment, the mirror unit 16 and the first mirror 34 are referred to as a receiver telescope. The transmitted light pulse sequence 30 reflects off the target 36 back toward the mirror unit 16 as a reflected light pulse timing sequence 40. The reflected light pulse sequence 40 is reflected off the mirror unit 16 toward a non-circular (e.g., aspheric) mirror 42, which reflects the reflected light pulse sequence 40 toward a second mirror 44 (e.g., a flat mirror). The reflected light pulse sequence 40 is reflected off the second mirror 44, passes through at least one lens 46, and is detected by the optical receiver 14. The period of time between which the transmitted light pulse 30 leaves the transmitter 12 and the reflected light pulse sequence 40 is received at the optical receiver 14 is referred to as the delay time.

Electronics 50 communicating with the transmitter 12 and the optical receiver 14 determine a range to the target 36 as a function of the delay time. In one embodiment, the range of the target 36 is determined by measuring the delay time of the reflected light pulse sequence received at the optical receiver 14 with respect to the transmitted light pulse sequence 30, corrected for pathlength differences in the transmitting and receiving optical paths.

Figure 2:
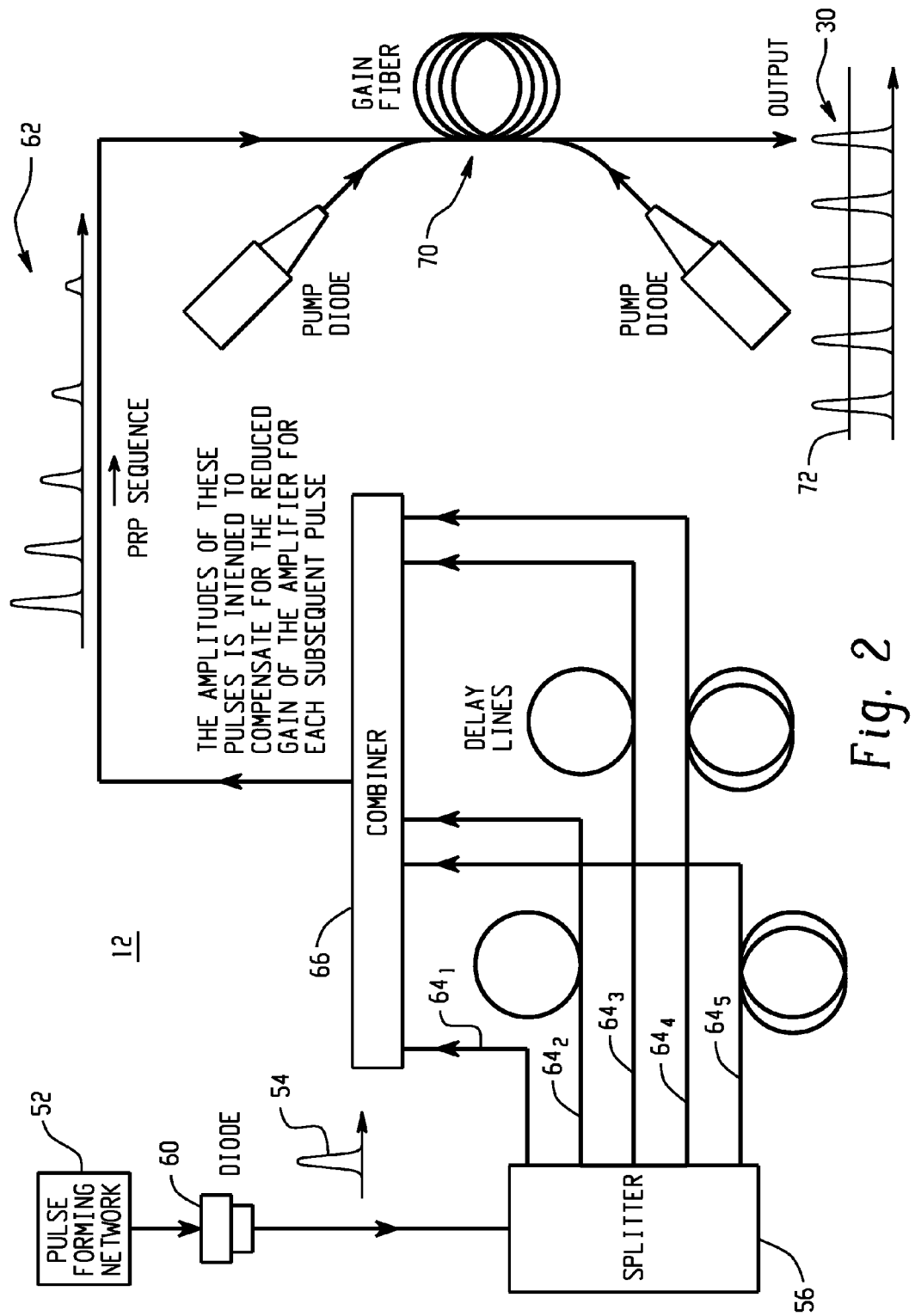
FIG. 2 illustrates a schematic representation of a transmitter in accordance with one embodiment of an apparatus illustrating principles of the present invention.

With reference to FIG. 2, an exemplary diagram of the transmitter 12 is illustrated in accordance with one embodiment of the present invention. The transmitter 12 includes a pulse forming network 52, which creates a transmitted electrical pulse. The transmitted electrical pulse from the pulse forming network 52 is converted to an optical laser pulse 54 by a converter 60 (e.g., a laser diode). The optical laser pulse 54 is transmitted to a splitter 56. The splitter 56 divides the optical laser pulse 54 into divided light pulses 62. The horizontal scale of the pulses 62 represents time increments determined by the receiver sampling rate (e.g., 10 GHz, in which case each count represents 1/10 ns).

The optical laser pulse 54 entering the splitter 56 is divided into five (5) separate light pulses that exit the splitter 56 via five (5) respective light transmission lines $64_1$, $64_2$, $64_3$, $64_4$, $64_5$, which transmit the light pulses to a combiner 66. Each of the light transmission lines $64_1$, $64_2$, $64_3$, $64_4$, $64_5$ is illustrated as having a unique length. The lines $64_2$, $64_3$, $64_4$, $64_5$ are coiled ($64_4$, $64_5$ are double coiled) to represent additional lengths in those lines. The various lengths of the light transmission lines $64_1$, $64_2$, $64_3$, $64_4$, $64_5$ affect the time between which the respective light pulses exit the splitter 56 and reach the combiner 66. More specifically, the light pulse exiting the splitter 56 and traveling to the combiner 66 along the line $64_1$ reaches the combiner 66 before the light pulse exiting the splitter 56 and traveling to the combiner 66 along the line $64_2$. It is contemplated that the time delay between the splitter 56 and the combiner 66 is proportional to the respective lengths of the light transmission lines $64_1$, $64_2$, $64_3$, $64_4$, $64_5$. In one embodiment, the lengths of the light transmission lines $64_1$, $64_2$, $64_3$, $64_4$, $64_5$ results in the light pulses reaching the combiner 66 at time intervals related to prime numbers.

After exiting the combiner 66, the five divided light pulses 62 pass through a gain amplifier 70, which amplifies the light pulses so that all of the pulses have amplitudes greater than a predetermined transmitted threshold 72. The horizontal scale of the pulse sequence 72 represents time increments determined by the receiver sampling rate (e.g., 10 GHz, in which case each count represents 1/10 ns). The amplified divided light pulse sequence is the transmitted light pulse timing sequence 30, with pseudo-random timing and which also includes five light pulses.

Figure 3:
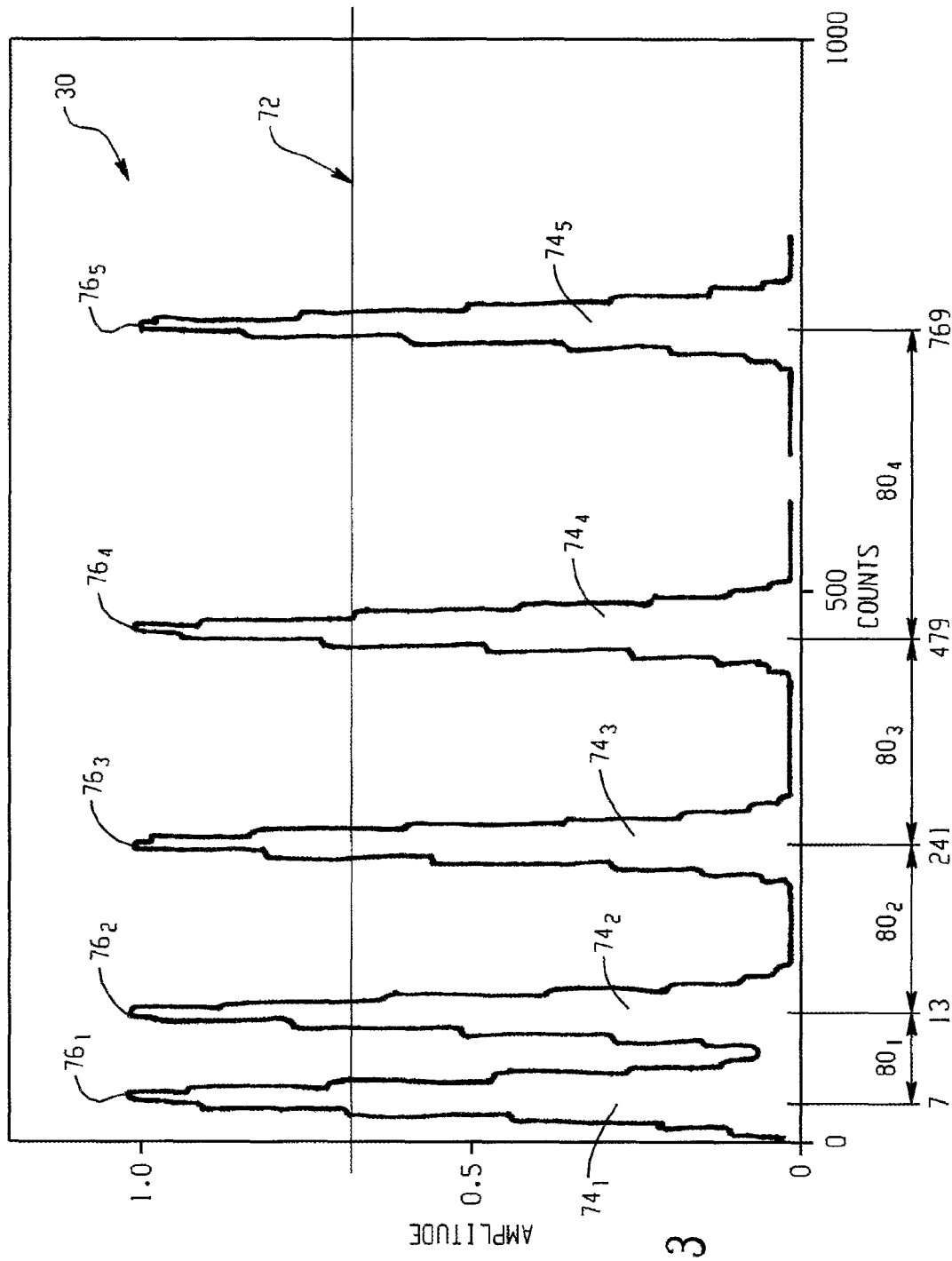
FIG. 3 illustrates a transmitted light pulse sequence in accordance with one embodiment of the present invention.

With reference to FIG. 3, in one embodiment, the transmitted light pulse timing sequence 30 includes the five (5) pulses $74_1$, $74_2$, $74_3$, $74_4$, $74_5$ of light having peaks $76_1$, $76_2$, $76_3$, $76_4$, $76_5$ above the predetermined transmitted threshold 72 (e.g., above a predetermined amplitude) at respective time intervals $80_1$, $80_2$, $80_3$, $80_4$. It is contemplated that the time intervals are unique and may be modulated by, for example, the lengths of the light transmission lines $64_1$, $64_2$, $64_3$, $64_4$, $64_5$ (see FIG. 2). Furthermore, it is contemplated that the time intervals between adjacent peaks are related to prime numbers. For example, if the respective peaks $76_1$, $76_2$, $76_3$, $76_4$, $76_5$ are at 0.7 ns, 1.3 ns, 24.1 ns, 47.9 ns, and 76.9 ns (i.e., 7 counts, 13 counts, 241 counts, 479 counts, and 769 counts), the respective time intervals $80_1$, $80_2$, $80_3$, $80_4$ are 0.6 ns, 22.8 ns, 23.8 ns, and 29.0 ns. Therefore, the illustrated embodiment of the transmitted light pulse sequence 30 includes five (5) pulses having five (5) respective peaks at times related to prime numbers. However, it is to be understood that other embodiments are also contemplated. The amplitude (y-axis) of FIG. 3 is merely intended as an index and, therefore, is not identified with any units. The horizontal scale of the pulse sequences in FIGS. 3-11 represent time increments determined by the receiver sampling rate (e.g., 10 GHz, in which case each count represents 1/10 ns).

Figure 4:
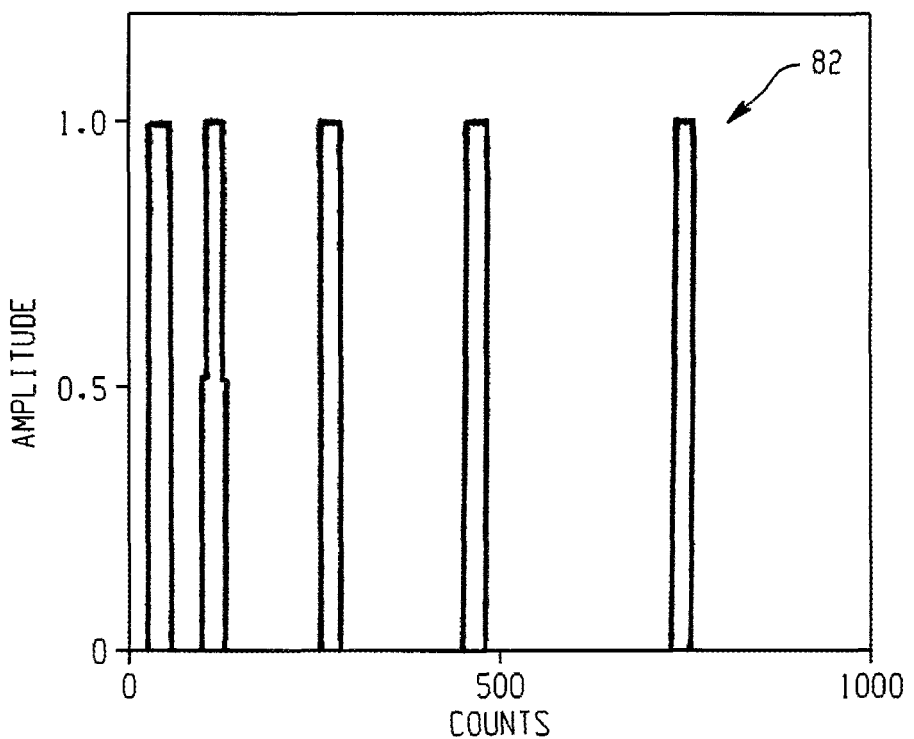
FIG. 4 illustrates a square wave representation of the transmitted light pulse sequence of FIG. 3.

The transmitted light pulse sequence 30 in FIG. 3 created by the transmitter 12 includes five (5) peaks at 0.7 ns, 1.3 ns, 24.1 ns, 47.9 ns, and 76.9 ns. With reference to FIG. 4, a square wave 82 (also referred to as a single-bit clipped) representation of the transmitted light pulse sequence 32 created by the transmitter 12 also includes five (5) square peaks at 0.7 ns, 1.3 ns, 24.1 ns, 47.9 ns, and 76.9 ns having amplitudes of ~1.0. The amplitude (y-axis) of FIG. 4 is either a "1" or a "0" with transition timing corresponding to amplitude thresholds in the unclipped pulse sequence in FIG. 3.

Figure 5:
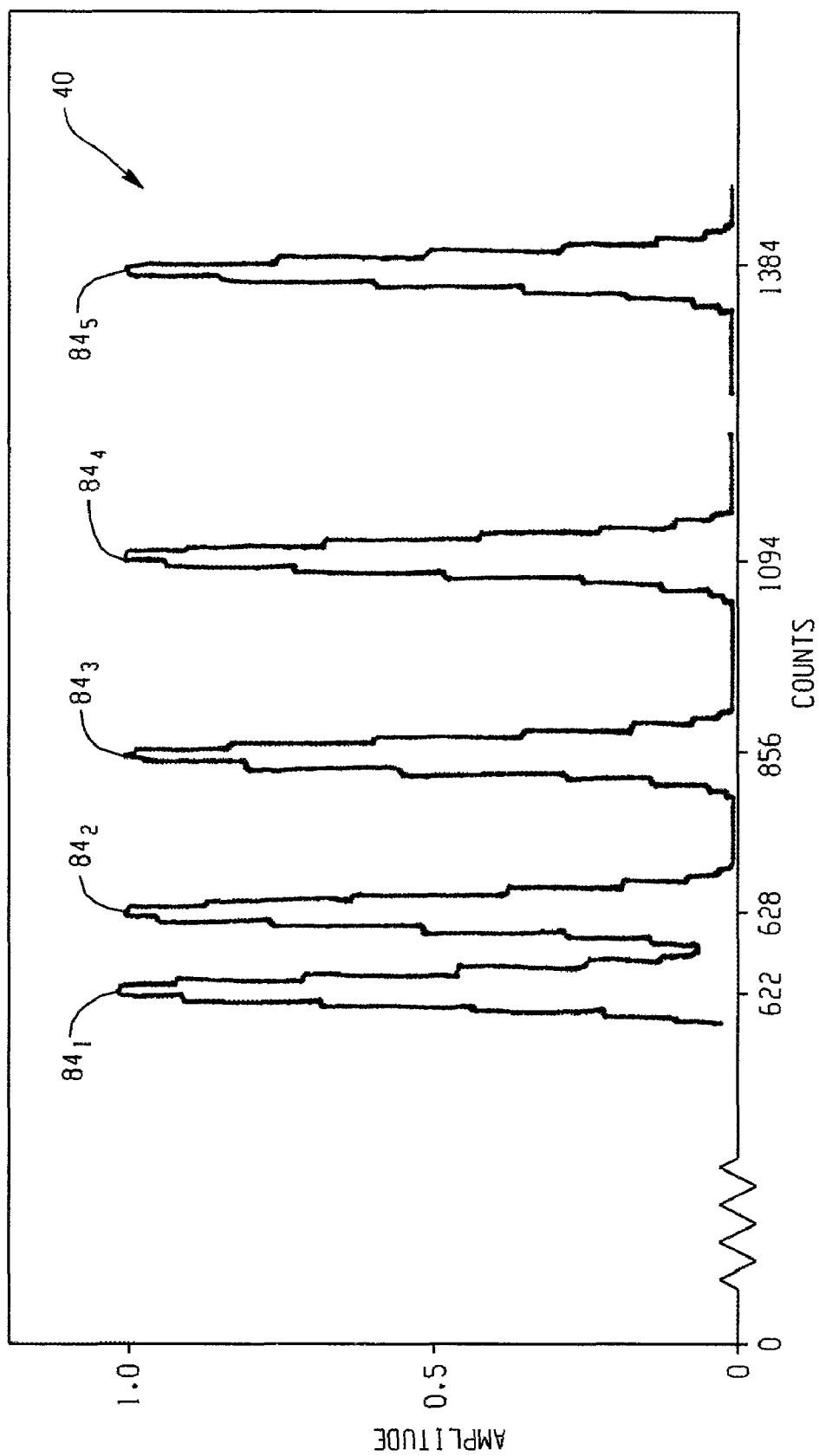
FIG. 5 illustrates a reflected light pulse sequence in accordance with one embodiment of the present invention.

With reference to FIG. 5, the reflected light pulse sequence 40 (without noise) substantially resembles, but is time shifted from, the transmitted light pulse sequence 30 (see FIG. 3) by 615 ns. More specifically, the reflected light pulse sequence 40 includes five (5) peaks $84_1$, $84_2$, $84_3$, $84_4$, $84_5$ at 62.2 ns, 62.8 ns, 85.6 ns, 109.4 ns, and 138.4 ns having amplitudes of ~1.0. Like FIG. 3, the amplitude (y-axis) of FIG. 5 is merely intended as an index and, therefore, is not identified with any units.

Figure 6:
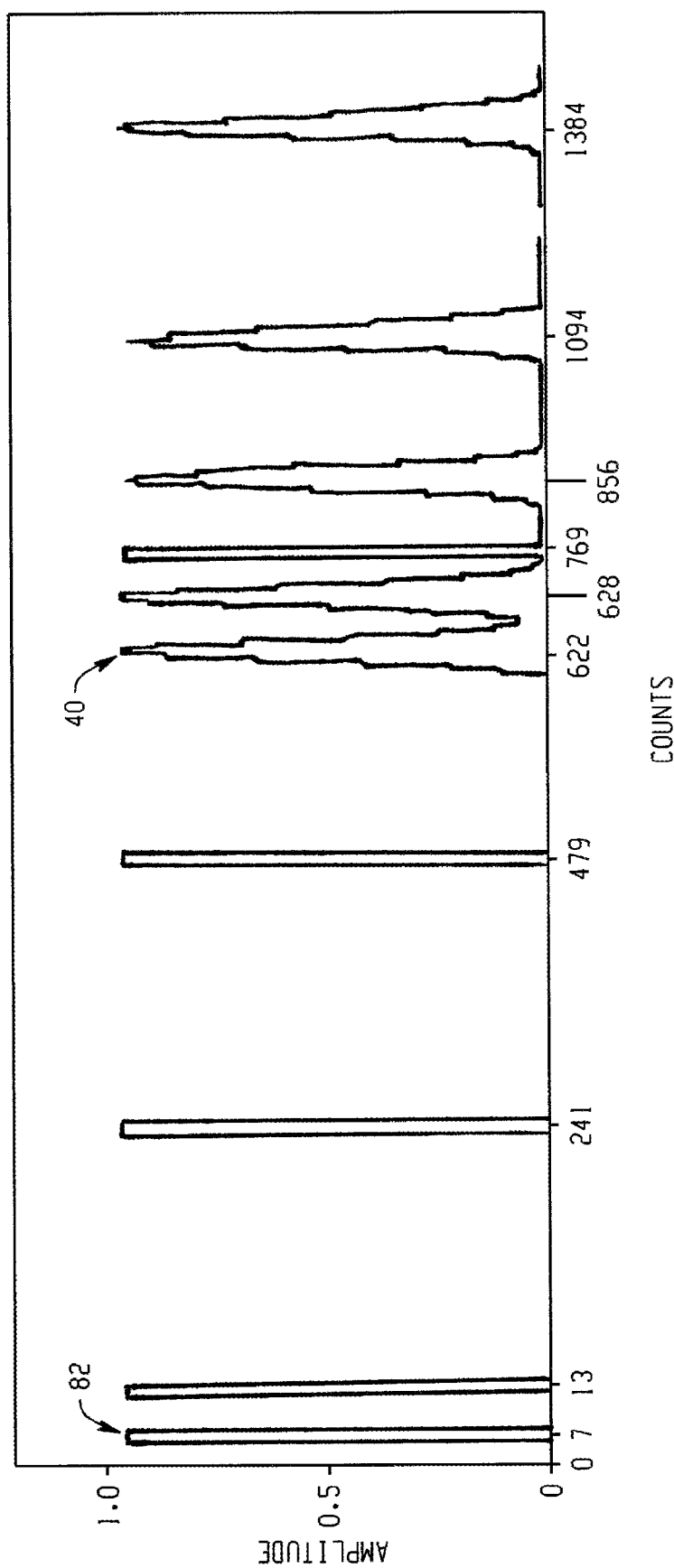
FIG. 6 illustrates the reflected light pulse sequence of FIG. 5 overlaid with the square wave representation of FIG. 4.

With reference to FIG. 6, the reflected light pulse sequence 40 is overlaid (at a zero (0) time delay) with the square wave 82 representation of the light pulse sequence 30 at a given delay time. The electronics 50 (see FIG. 1) correlate the reflected light pulse sequence 40 with the square wave 82 representation of the light pulse sequence 30 at the different time shifts (time delays) between the reflected light pulse sequence 40 and the square wave 82 representation of the transmitted light pulse sequence 30. More specifically, at each of a plurality of different time shifts between the reflected light pulse sequence 40 and the square wave 82 representation of the transmitted light pulse sequence 30, the electronics 50 determines a sum of the corresponding numerical values representing the reflected light pulse sequence 40 within the positive values of the square wave 82 representation.

In the illustrated embodiment, since the amplitude of the square wave 82 (see FIG. 4) is ~1.0, the electronics 50 merely determines approximately a sum of the numerical values representing the reflected light pulse sequence 40. However, in other embodiments in which, for example, the transmitted light pulse sequence 30 (instead of the square wave representation 82 transmitted light pulse sequence 30) is correlated with the reflected light pulse sequence 40, all of the corresponding numerical values representing the transmitted light pulse sequence 30 and the reflected light pulse sequence 40 are multiplied at each of the different time shifts. Then, all of the products for each of the respective time shifts are summed together. Using the clipped pseudo-random sequence rather than the actual pulse sequence amplitudes speeds and simplifies the correlation process.

Figure 7:
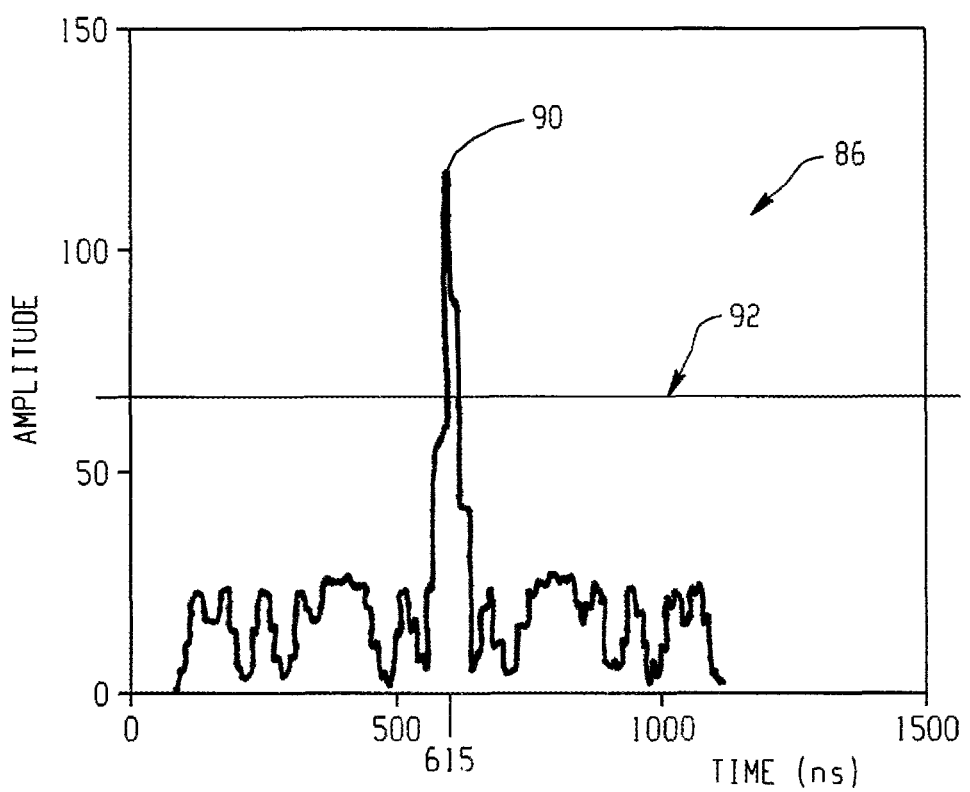
FIG. 7 illustrates a graph of the correlation between the reflected light pulse sequence of FIG. 5 and the square wave of FIG. 4 with a relative time delay of 615 ns.

With reference to FIG. 7, a graph 86 is illustrated showing the correlation between the reflected light pulse sequence 40 (see FIG. 5) and the square wave 82 (see FIG. 4) representation of the light pulse sequence 30. A peak 90 above a correlation threshold 92 (amplitude) is evident in the correlation graph 86 at about 615 counts (~61.5 ns). Therefore, the electronics 50 determine that the time delay between the transmitted light pulse sequence and the reflected light pulse sequence is about 61.5 ns. It is to be appreciated that the signal-to-noise ratio at the peak 90 is improved by the averaging inherent in the correlation process. The lower correlation peaks represent alignment of individual pulses of the pulse sequence with peaks in the clipped pulse sequence. The high correlation peak is at the delay time where the peaks of both pulse sequences all align. The prime number spacing of the pseudo-random pulse sequence insures that this only occurs at one delay time.

In the illustrated embodiment, the time intervals between the peaks of the transmitted light pulse sequence are separated by prime numbers to reduce the possibility that multiple peaks of the reflected light pulse sequence do not align with peaks of the square wave representation 82 (see FIG. 4) of the transmitted light pulse sequence except at the delay time associated with the peak 90. Therefore, the transmitted light pulse sequence is referred to as a pseudo-random sequence-random in the sense that the transmitted light pulse sequence will less likely be aligned with the reflected light pulse sequence except at the delay time associated with the peak 90, but not completely random in the sense that the peaks of the transmitted light pulse sequence are separated according to a defined function (e.g., prime numbers).

The electronics 50 determine a range to the target 36 as a function of the time delay.

Figure 8:
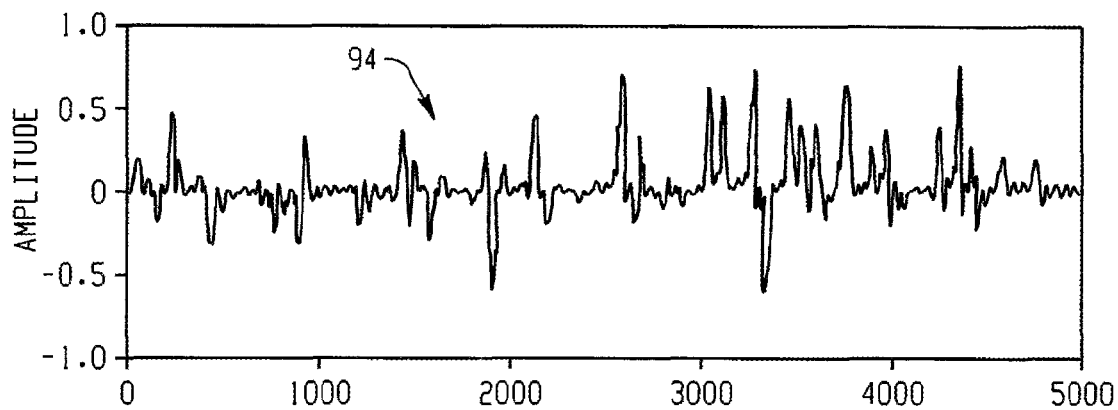
FIG. 8 illustrates a reflected light pulse sequence in accordance with another embodiment of the present invention.
Figure 9:
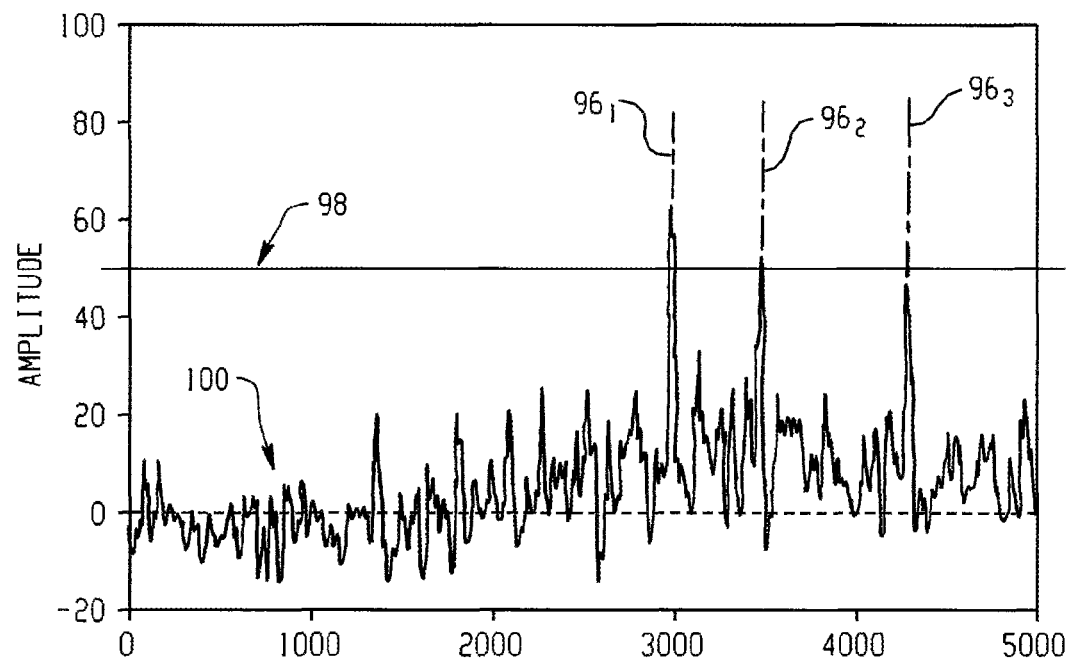
FIG. 9 illustrates a graph of the correlation between the reflected light pulse sequence of FIG. 8 and the clipped or square wave representation of FIG. 4.

With reference to FIG. 8, a graph 94 is illustrated for another embodiment representing a reflected light pulse sequence, including random noise, having three (3) different delay times (e.g., ~300 ns, ~350 ns, and ~430 ns) from three (3) different targets at respective ranges. Once the graph 94 is correlated with a square wave representation of the corresponding transmitted light pulse sequence (see FIG. 4), three (3) peaks $96_1$, $96_2$, $96_3$ above a correlation threshold 98 are evident in a graph 100 (see FIG. 9). The peaks $96_1$, $96_2$, $96_3$ are at delay times of ~300 ns, ~350 ns, and ~430 ns. As discussed with reference to the prior embodiment, the electronics determine three (3) respective ranges to the three (3) targets as a function of the time delays.

Figure 10:
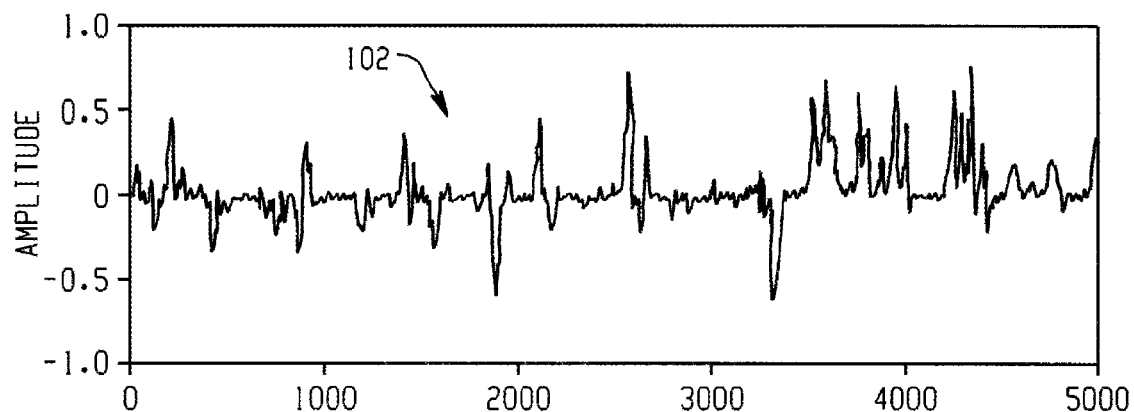
FIG. 10 illustrates a reflected light pulse sequence in accordance with another embodiment of the present invention.
Figure 11:
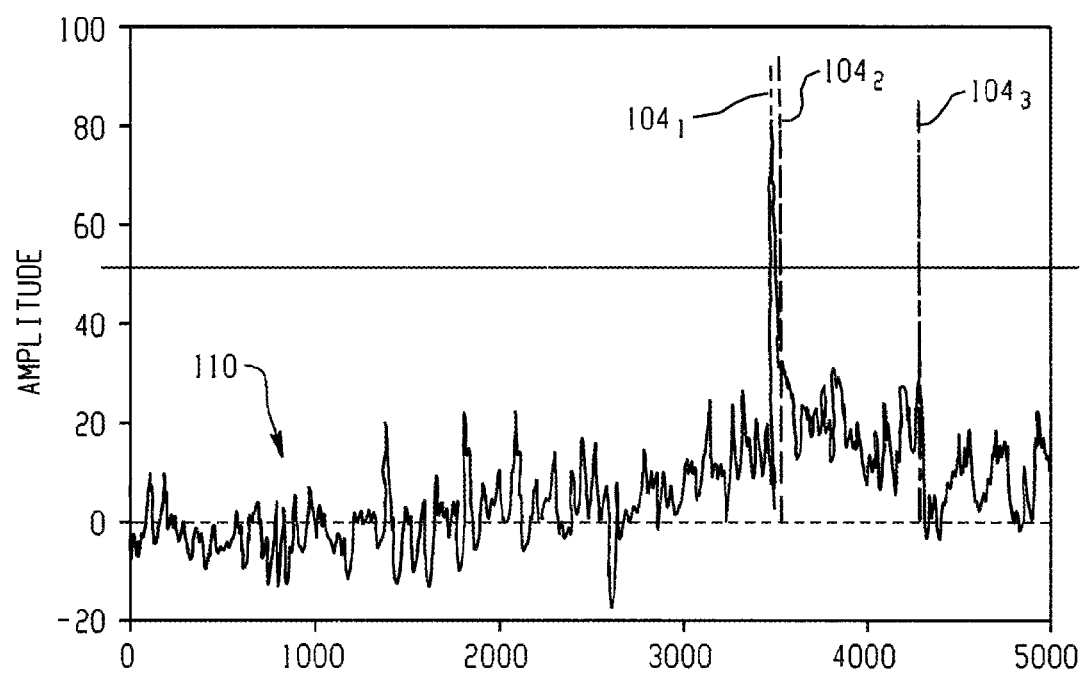
FIG. 11 illustrates a graph of the correlation between the reflected light pulse sequence of FIG. 10 and the clipped or square wave representation of FIG. 4.

With reference to FIG. 10, a graph 102 is illustrated representing a reflected light pulse sequence including three (3) different delay times (e.g., ~350 ns, ~351.5 ns, and ~430 ns) from three (3) different targets at respective ranges. Once the graph 102 is correlated with a square wave representation of the corresponding transmitted light pulse sequence (see FIG. 4), three (3) peaks $104_1$, $104_2$, $104_3$ above a correlation threshold 106 are evident in a graph 110 (see FIG. 11). The peaks $104_1$, $104_2$, $104_3$ are at delay times of ~350 ns, ~351.5 ns, and ~430 ns. In this embodiment, the peaks $104_1$, $104_2$ are substantially closer together than the peaks $96_1$, $96_2$ (see FIG. 9). As discussed above, the electronics determine three (3) respective ranges to the three (3) targets as a function of these time delays. The embodiment discussed with reference to FIGS. 10 and 11 illustrates that multiple targets that are relatively close to one another (e.g., within ~8 inches of each other) can be distinguished if the receiver 14 and electronics 50 are capable of digitizing and processing from the peaks $104_1$, $104_2$, $104_3$ within a short enough time period (e.g., 0.1 ns). In addition, ranges may be determined for such targets that are relatively close together (i.e., delay time differences greater than or comparable to the individual light pulse widths).

Figure 12:
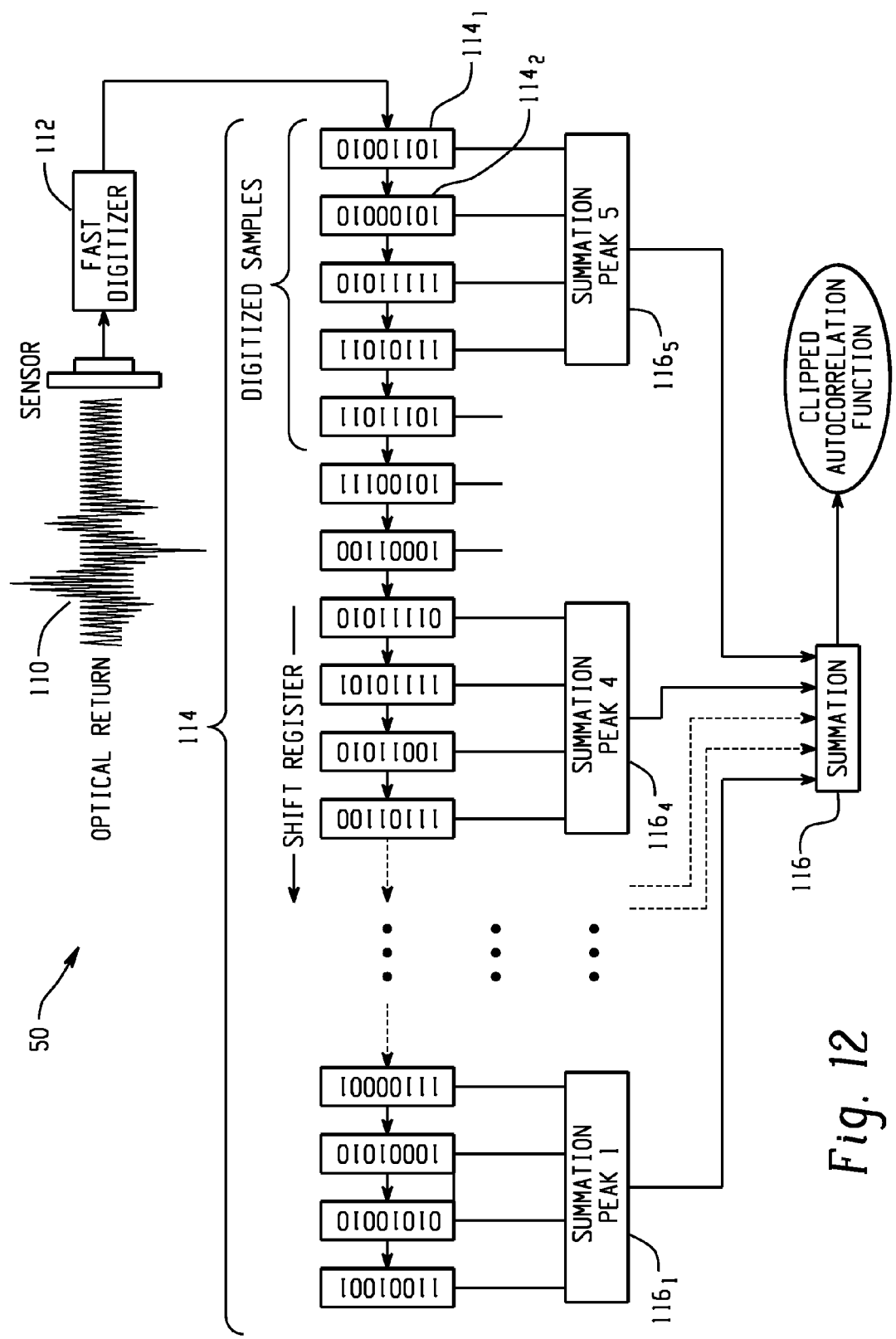
FIG. 12 illustrates a schematic representation of electronics for correlating a reflected light pulse with a corresponding square wave representation of the transmitted light pulse sequence in accordance with one embodiment of an apparatus illustrating principles of the present invention.

With reference to FIG. 12, one embodiment of the electronics 50 is illustrated for correlating a reflected light pulse with a corresponding square wave representation of the transmitted light pulse sequence in near-real time. The optical reflected light pulse sequence 110 is digitized by a digitizer 112. The reflected light pulse sequence is sampled at a predetermined sampling frequency (e.g., ten times every nanosecond). For each sample, the amplitude (peak) of the reflected light pulse sequence at the corresponding delay time is digitized and transmitted to a register $114_1$. The digitized amplitude of the next sample is transmitted to the register $114_1$ as the data in each of the registers 114 is shifted to the next register (e.g., the data in the register $114_1$ is shifted to the register $114_2$) at the digitization rate.

A plurality of arithmetic operators 116 electrically communicate with respective groups of the registers 114. Since the square wave representation 82 (see FIG. 4) includes five (5) peaks, it is contemplated to include five (5) of the arithmetic operators 116. For the purposes of illustration, only three (3) of the arithmetic operators $116_1$, $116_4$, $116_5$ are shown.

In the illustrated example, each of the arithmetic operators 116 electrically communicates with a respective group of the registers 114. In the illustrated embodiment, each of the groups includes four (4) of the registers 114 to ensure that each of the groups of registers captures the entire width of the respective pulses in the square wave 82 (see FIG. 4) and the width of the respective pulses in the reflected light pulse sequence. Therefore, the number of registers electrically communicating with the respective arithmetic operators is a function of the widths of the pulses in the square wave 82 (see FIG. 4) and the reflected light pulse sequence.

In addition, each of the arithmetic operators 116 is associated with one of the times of the pulses in the square wave representation 82 (see FIG. 4). Therefore, the registers associated with arithmetic operator $116_1$ are associated with the pulse at 0.7 ns in the square wave 82 (see FIG. 4), the registers associated with arithmetic operator $116_4$ are associated with the pulse at 47.9 ns in the square wave 82 (see FIG. 4), and the registers associated with arithmetic operator $116_5$ are associated with the pulse at 76.9 ns in the square wave 82 (see FIG. 4). It is to be understood that additional arithmetic operators (not shown) are associated with the pulses at 1.3 ns and 24.1 ns.

The data values in the registers 114 representing the reflected light pulse sequence are thus multiplied by the "0" or "1" values of the square wave representation of the transmitted light pulse sequence (using the arithmetic operators 116) and then all summed (using the arithmetic operators 116) as discussed above at the predetermined sampling frequency (e.g., after each of the register shifts). The delay time associated with each of the respective sums is determined as a function of the number of register shifts that have occurred. Shifting the reflected light pulse sequence through the registers and summing the products of the reflected light pulse sequence to the values in the registers of the unshifted square wave representation has the effect of moving the transmitted light pulse sequence relative to the square wave representation. As discussed above, the sum of the products of the transmitted light pulse sequence and the square wave representation of the transmitted light pulse sequence produces the peak 90 (see FIG. 7) where the transmitted light pulse sequence and the square wave representation are substantially aligned.

The laser pulse sequence described above acts to effectively increase a power of a laser while reducing any non-liner effects typically associated with actual increased power of a single-pulse laser.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A light detection and ranging system, comprising:
   a transmitter transmitting a transmitted tight pulse timing sequence, with pseudo-random timing and including a plurality of light pulses, toward a target;
   an optical receiver receiving a reflected light pulse timing sequence including a plurality of light pulses from the target; and
   an electronic control unit identifying a time delay between the transmitted light pulse timing sequence and the reflected light pulse timing sequence as a function of a correlation between the transmitted and reflected light pulse timing sequences, the correlation being a representation of a single-bit clipped square wave representation of the transmitted light pulse timing sequence overlaid by, and shifted from, the reflected light pulse timing sequence, which is unclipped.

2. The light detection and ranging system as set forth in claim 1, wherein the light pulses of the transmitted light pulse timing sequence include peaks above a predetermined transmit-threshold at respective time intervals.

3. The light detection and ranging system as set forth in claim 2, wherein the time intervals between the transmitted light pulse timing sequence peaks are chosen to reduce spurious self-correlations.

4. The light detection and ranging system as set forth in claim 3, wherein the time intervals between the transmitted light pulse timing sequence peaks are related to prime numbers.

5. The light detection and ranging system as set forth in claim 2, wherein:
   the light pulses of the reflected light pulse timing sequence include peaks above a predetermined reflected threshold at the time intervals.

6. The light detection and ranging system as set forth in claim 1, wherein:
   the correlation is a representation of the transmitted light pulse timing sequence overlaid by, and shifted from, the reflected light pulse timing sequence.

7. The light detection and ranging system as set forth in claim 6, wherein:
   respective shifts represent a time between the transmitted and reflected light pulse timing sequences;
   for each of the shifts, respective products are determined for values of the transmitted and the reflected light pulse timing sequences at a plurality of times;
   for each of the shifts, a sum of the products is determined;
   a sum having a correlation peak above a predetermined threshold is identified; and
   the time delay between the transmitted and reflected light pulses is determined as a function of the shift between the transmitted and reflected light pulse timing sequences at the correlation peak.

8. The light detection and ranging system as set forth in claim 7, wherein:
   a range between the target and the receiver is determined as a function of the time delay.

9. The light detection and ranging system as set forth in claim 7, wherein:
   a second sum having a second correlation peak above the predetermined threshold is identified; and
   a second time delay between the transmitted and reflected light pulses is determined as a function of the shift between the transmitted and reflected light pulse timing sequences at the second correlation peak.

10. The light detection and ranging system as set forth in claim 9, wherein:
    a second range between a second target and the receiver is determined as a function of the second time delay.

11. The light detection and ranging system as set forth in claim 1, wherein:
    respective shifts represent a time between the square wave representation and the reflected light pulse timing sequence;
    for each of the shifts, a sum of values of the reflected light pulse timing sequence is determined for times at which the square wave representation is not zero;
    a sum having a correlation peak above a predetermined threshold is identified; and
    the time delay between the transmitted and reflected light pulse timing sequences is determined as a function of the shift between the square wave representation and the reflected light pulse timing sequence at the correlation peak.

12. A method of determining a range to a target, the method comprising:
    transmitting a transmitted light pulse timing sequence, with pseudo-random timing and including a plurality of light pulses, toward the target;
    receiving, at an optical receiver, a reflected light pulse timing sequence including a plurality of light pulses from the target; and
    identifying a time delay between the transmitted light pulse timing sequence and the reflected light pulse timing sequence as a function of a correlation between the transmitted and reflected light pulse timing sequences, the correlation being a representation of a single-bit clipped square wave representation of the transmitted light pulse timing sequence overlaid by, and shifted from, the reflected light pulse timing sequence, which is unclipped.

13. The method of determining a range to a target as set forth in claim 12, wherein the transmitting step includes:
    transmitting peaks, in the light pulses, above a predetermined transmit-threshold at respective time intervals.

14. The method of determining a range to a target as set forth in claim 13, further including:
    relating the time intervals between the transmitted light pulse timing sequence peaks to prime numbers.

15. The method of determining a range to a target as set forth in claim 12, further including:
    creating the correlation between the transmitted and reflected light pulse timing sequences, including:
        shifting a representation of the transmitted light pulse timing sequence from a representation of the reflected light pulse timing sequence; and
        overlaying the representation of the transmitted light pulse timing sequence with the shifted reflected light pulse timing sequence.

16. The method of determining a range to a target as set forth in claim 15, further including:
    determining respective shifts representing a time between the transmitted and reflected light pulse timing sequences;

for each of the shifts, determining respective products for values of the transmitted and the reflected light pulse timing sequences at a plurality of times;

for each of the shifts, determining a sum of the products;

identifying a sum having a correlation peak above a predetermined threshold; and determining the time delay between the transmitted and reflected light pulses as a function of the shift between the transmitted and reflected light pulse timing sequences at the correlation peak.

17. The method of determining a range to a target as set forth in claim 16, further including:

determining a range between the target and the receiver as a function of the time delay.

18. A light detection and ranging system, comprising:

a pulse forming network generating an electrical pulse;

a converter that converts the electrical pulse into an optical pulse;

a splitter that divides the optical pulse into divided light pulses that form a transmitted light pulse timing sequence with pseudo-random timing and including a plurality of light pulses;

a transmitter transmitting the transmitted light pulse timing sequence toward a target;

an optical receiver receiving a reflected light pulse timing sequence including a plurality of light pulses from the target; and an electronic control unit identifying a time delay between the transmitted light pulse timing sequence and the reflected light pulse timing sequence as a function of a correlation between the transmitted and reflected light pulse timing sequences, the correlation being a representation of a single-bit clipped square wave representation of the transmitted light pulse timing sequence overlaid by, and shifted from, the reflected light pulse timing sequence, which is unclipped.

19. The light detection and ranging system as set forth in claim 18, further including:

a gain amplifier that amplifies the transmitted light pulse timing sequence to ensure all of the pulses have amplitudes greater than a predetermined transmit-threshold.

20. The light detection and ranging system as set forth in claim 18, wherein the converter is a diode.

* * * * *